(12) United States Patent
Alarcon

(10) Patent No.: US 9,297,268 B2
(45) Date of Patent: Mar. 29, 2016

(54) FAN BLADE PLATFORM FLAP SEAL

(75) Inventor: Andrew G. Alarcon, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 795 days.

(21) Appl. No.: 13/605,237

(22) Filed: Sep. 6, 2012

(65) Prior Publication Data

US 2014/0064935 A1    Mar. 6, 2014

(51) Int. Cl.
*F01D 11/00* (2006.01)
*F04D 29/08* (2006.01)
*F04D 29/32* (2006.01)
*F16J 15/10* (2006.01)

(52) U.S. Cl.
CPC ............ *F01D 11/008* (2013.01); *F04D 29/083* (2013.01); *F04D 29/329* (2013.01); *F16J 15/104* (2013.01)

(58) Field of Classification Search
CPC ..... F01D 11/008; F01D 11/00; F01D 11/005; F04D 29/083; F16J 15/102; F16J 15/104; F16J 15/022; F16J 15/025
See application file for complete search history.

(56) References Cited

U.S. PATENT DOCUMENTS 5,464,326 A * 11/1995 Knott .................. 416/193 A
6,217,283 B1 * 4/2001 Ravenhall et al. ........... 416/2
7,950,900 B2   5/2011 Mulcaire et al.

* cited by examiner

*Primary Examiner* — Richard Edgar
*Assistant Examiner* — Juan G Flores
(74) *Attorney, Agent, or Firm* — Carlson, Gaskey & Olds P.C.

(57) ABSTRACT

A seal for sealing a gap between adjacent first and second components, includes a first portion for attaching to the first component and a second portion extending at an angle from the first portion, the second portion having a top extending therealong that is flat in an uninstalled position, a thickened portion beneath the top and a hinge wherein the thickened portion is disposed between the hinge and an end of the top.

17 Claims, 2 Drawing Sheets

FAN BLADE PLATFORM FLAP SEAL

BACKGROUND

This invention relates to gas turbine engines. More specifically, it relates to an assembly for bridging gaps between adjacent airfoils in rotor or stator stages of gas turbine engines. The invention is particularly suited to seals with circumferential spacers in a fan stage of an engine, but it may equally well be applied in other parts of the engine.

Conventionally a fan rotor stage in a gas turbine engine comprises a plurality of radially extending fan blades mounted on a rotor. The blades are mounted on the rotor by inserting the inner end of the blade in a correspondingly shaped retention grooves disposed about the rotor. Circumferential spacers bridge the gaps between adjacent blades to define gas path that provides thrust for an aircraft.

A resilient seal is placed between the circumferential spacers and the adjacent fan blades. The seal may protrude to abut the adjacent fan blades and seal the gaps to prevent gas from leaking between the circumferential spacers and the blades.

A large number of seal designs are known, including solid rubber seals, bellows seals, brush seals, compressible tube seals and composite seals with a rubber tip. Solid rubber seals may be heavy, the rubber tips of the composite seals are prone to debonding, and bellows seals are prone to severe erosion because the bellows sits close to the airstream.

SUMMARY

According to a non-limiting embodiment disclosed herein, a seal for sealing a gap between adjacent first and second components that form a ring, includes a first portion for attaching to the first component and a second portion extending at an angle from the first portion, the second portion having a top extending therealong that is flat in an uninstalled position, a thickened portion beneath the top and a hinge wherein the thickened portion is disposed between the hinge and an end of the top.

In a further embodiment of any of the above claims, the seal has an installed position wherein the second portion rotates about the hinge for engaging the second component.

In a further embodiment of any of the above claims, the angle is less than approximately 90°.

In a further embodiment of any of the above claims, the first portion has a curved portion for bending around a joint of the first component.

In a further embodiment of any of the above claims, a flat portion connects the curved portion and the top.

In a further embodiment of any of the above claims, a transition area connects the thickened area and the first portion, the transition area defining the hinge.

In a further embodiment of any of the above claims, the second portion bends about the hinge thereby having a first part for engaging the second component and a second part for extending toward the gap.

In a further embodiment of any of the above claims, the first part moves radially outwardly during rotation of the components.

According to a second non-limiting invention, a method for sealing gaps between a spacer and a blade that at least partially form a ring, includes the steps of: providing a seal having a first portion for attaching to the spacer, a second portion extending at an angle from the first portion, the second portion having a top extending therealong that is flat in an uninstalled position, a thickened portion beneath the top and a hinge wherein the thickened portion is disposed between the hinge and an end of the top; attaching the first portion of the seal to the spacer, bending the second portion about the hinge; and, sliding the spacer along the blade such that the second portion abuts the blade and the second portion faces the gap.

In a further embodiment of any of the above claims, the attaching step includes attaching a curved portion of the first portion around a joint or bend of the spacer.

In a further embodiment of any of the above claims, the bending step includes bending a transition area connecting the thickened area and the first portion, the transition area defining the hinge.

In a further embodiment of any of the above claims, the bending step includes bending the second portion into a first part engaging the blade and a second part facing toward the gap.

In a further embodiment of any of the above claims, the method includes moving the first part radially outwardly during rotation of the blade and spacer.

According to a second non-limiting invention, an assembly for sealing a gap in a gas turbine engine, includes a plurality of blades, a plurality of spacers interspersed between the blades, and a seal. The seal has a first portion fixedly attaching to the spacer, a second portion extending at an angle from the first portion, the second portion having a top extending therealong that is flat in an uninstalled position, a thickened portion beneath the top and a hinge wherein the thickened portion is disposed below the top between the hinge and an end of the top.

In a further embodiment of any of the above claims, the seal has an installed position wherein the second portion rotates about the hinge and engages the blade.

In a further embodiment of any of the above claims, the first portion has a curved portion for bending around a joint or bend of the spacer.

In a further embodiment of any of the above claims, a transition area connects the thickened area and the first portion, the transition area defining the hinge.

In a further embodiment of any of the above claims, the second portion bends about the hinge and the first portion has a first part engaging the spacer and a second part facing the gap.

In a further embodiment of any of the above claims, the second portion moves radially outwardly during rotation of the spacers and the blades until the thickened area engages the second part.

The various features and advantages of this disclosure will become apparent to those skilled in the art from the following detailed description. The drawings that accompany the detailed description can be briefly described as follows.

DETAILED DESCRIPTION

Figure 1:
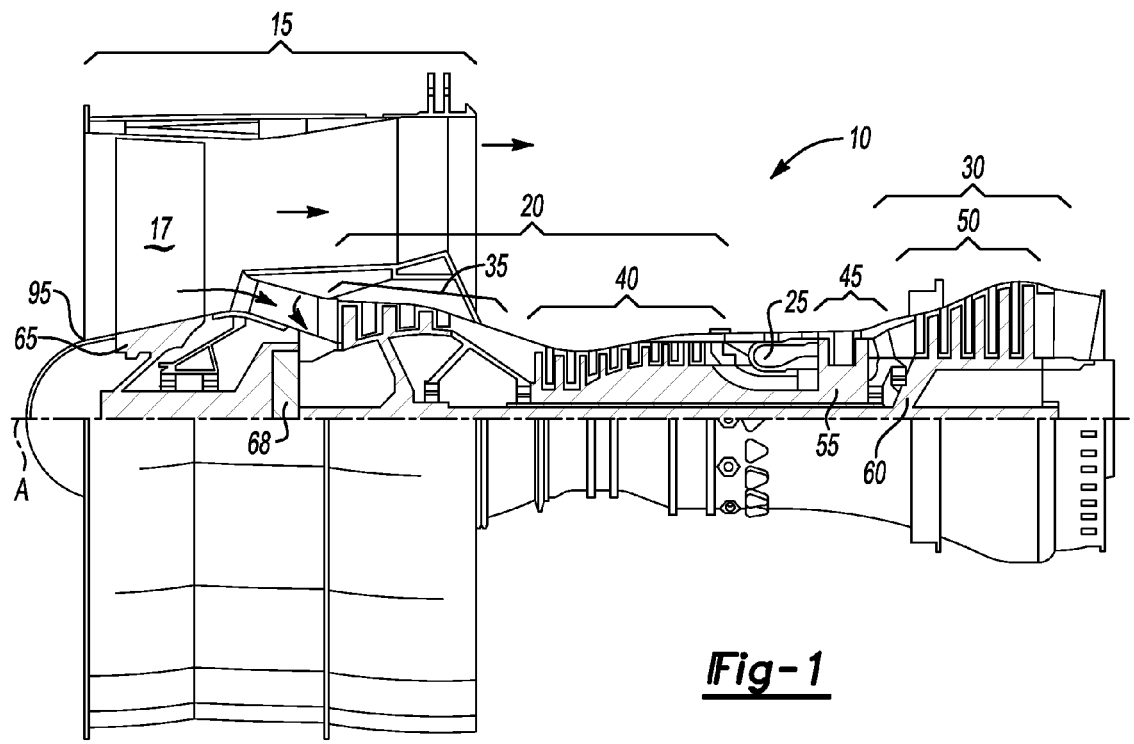
FIG. 1 is a schematic, cross-sectional view of a gas turbine engine incorporating an embodiment of a seal therein.
Figure 2:
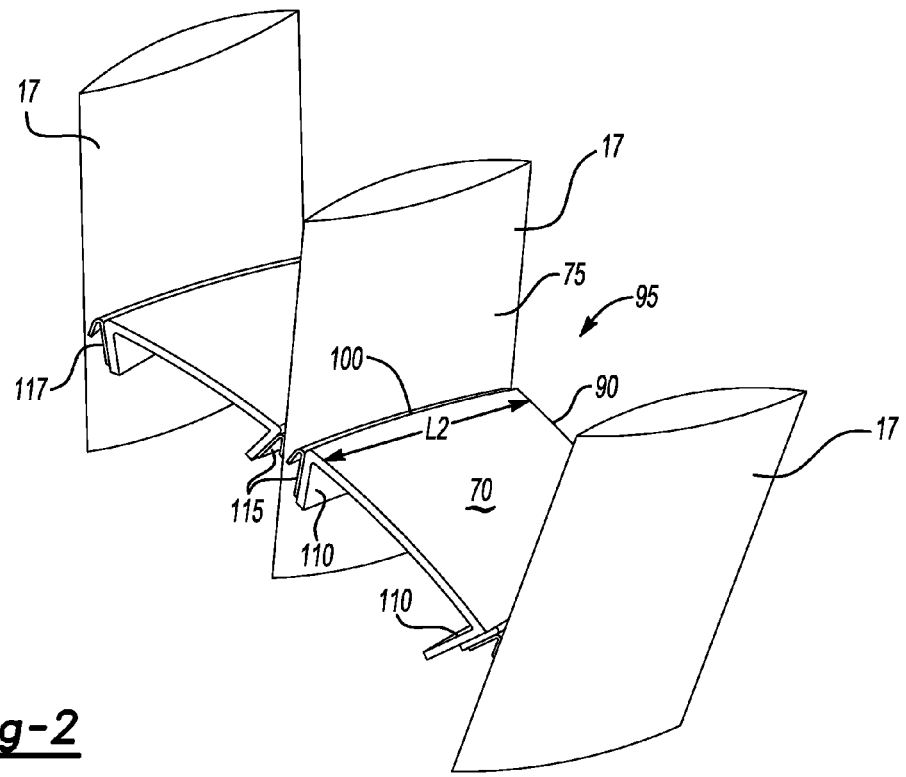
FIG. 2 is a schematic, perspective view of a fan ring incorporating an embodiment of a seal therein for use with the gas turbine engine of FIG. 1.

Referring to FIGS. 1 and 2, a gas turbine engine 10 includes a fan section 15 including a plurality of fan (or other) blades 17, a compressor section 20, a combustor 25 and a turbine section 30. The example compressor section 20 includes a low pressure compressor section 35 and a high pressure compressor section 40. The turbine section 30 includes a high pressure turbine 45 and a low pressure turbine 50. The high pressure compressor section 40 and the high pressure turbine 45 are supported by a high spool 55. The low pressure compressor section 35 and low pressure turbine 50 are supported on a low spool 60. Spools 55 and 60 and components attached thereto, such as fan rotor 65, rotate about a main axis A. Air drawn in through the compressor section 20 is compressed and fed into the combustor 25. In the combustor 25, the compressed air is mixed with fuel and ignited to generate a high speed gas stream. This gas stream is drives the turbine section 30. A gear box 68 may connect the low spool 60 to the fan rotor 65.

Referring now to FIG. 2, a plurality of fan blades 17 separated by spacers 70 is shown. In accordance with the aerodynamic requirements of gas turbine engine 10 and the aircraft to which it is mounted, a pattern of fan blade-spacer, fan blade-spacer continues circumferentially around the fan rotor 65. As is known in the art, each fan blade 17 has an airfoil 75. Each spacer 70 has an outer arcuate surface 90 that forms a ring 95 with the other spacers 70 that is aerodynamically spaced about axis A. Though closely aligned, a gap 100 exists between each spacer outer arcuate surface 90 and an adjacent blade 17. The gap 100 is sealed, as will be discussed infra, to minimize a loss of airflow through the gas turbine engine 10. The gap 100 may be contoured in register with any contours of each outer arcuate surface 90 and the shape of the blades 17. The blades 17 and spacers 70 are components that form the ring 95. Other arrangements besides fan blade/spacer are possible like fan blade/fan blade, etc.

Each spacer 70 has a pair of legs 110 extending radially inwardly towards axis A. The legs 110 and the blades 17 are attached to the fan rotor 65, typically by sliding the legs 110 and the blades 17 into complementary slots (not shown) in the fan rotor 65, as is known in the art. A seal 115 attaches to each leg 110 of the spacer 70 to seal the gap 100 as will be discussed infra.

Figure 3:
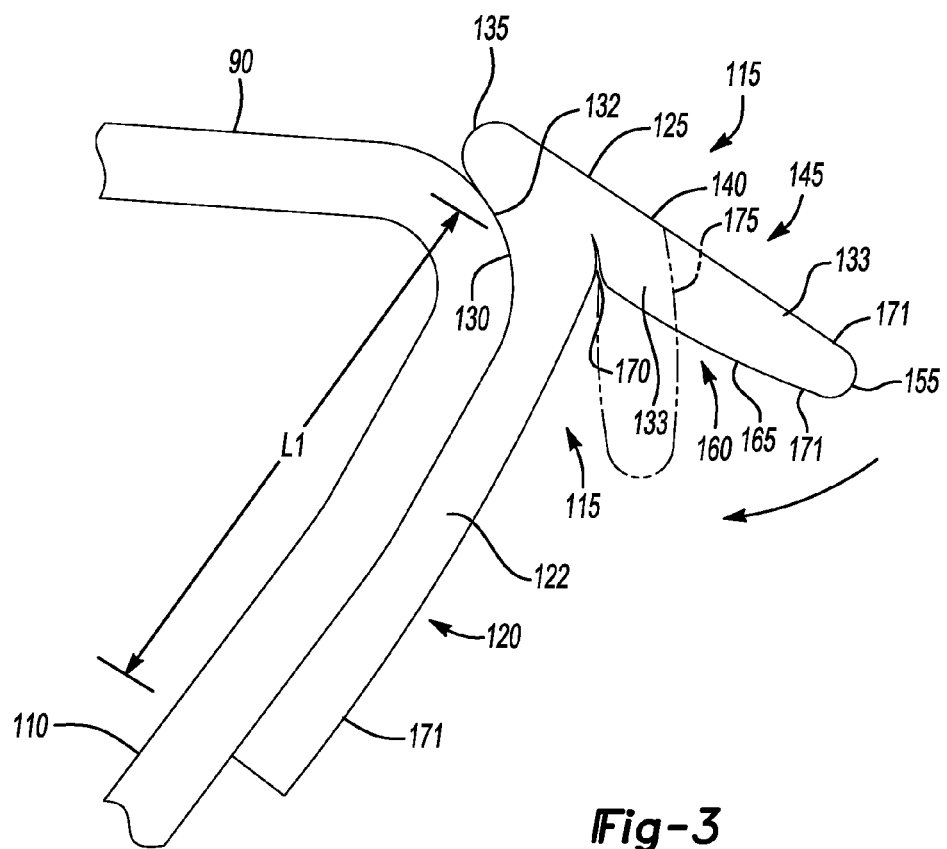
FIG. 3 is a schematic, cross-sectional view of a seal in an uninstalled state for use in the fan ring of FIG. 2.

Referring now to FIG. 3, seal 115 in an uninstalled state is described. The seal has an upper case gamma-shaped body 120 that is secured along its length $L_1$ to a leg 110. The body 120 has a first member (or portion) 122 that extends the length $L_2$ (See FIG. 2) of a gap 100 and conforms basically to the shape of the leg 110 and the blade 17. The first member 122 has a curved portion 132 that allows the body 120 to bend partially around a joint 130 between outer surface 90 and leg 110.

A second member (or portion) 133 extends at a less than 90° angle from the first member 122 in an unassembled position 145. The second member 133 has a flat top defined by portion 125 extending from adjacent the curved portion 135 to a rounded portion 155. A bottom 160 of the second member 133 has a thickened portion 165 between the rounded portion 155 and a curved transition area 170 (which acts as a hinge) between the bottom 160 and the elongated body 120. The thickness between the curved transition area 170 and the top 125 is less than the thickness of the thickened portion 165 to allow the thickness between the curved transition area 170 and the top 125 to hinge.

The seal 115 is elastomeric with a fabric wear-resistant coating or cover 171. Other materials may be used. For instance, the curved transition area 170 may have a different durometer than the rest of the seal 115 so that bending is easier about that curved transition area 170. Additionally, if other material is sufficiently wear resistant, the outer fabric cover 171 may be omitted Referring now to FIG. 4, seal 115 is shown in an installed state 180 attached to a leg 110 and abutting an adjacent blade 17. The second member 133 hinges about curved transition area 170 so that a portion 185 of the second member 133 abuts a blade 17 and a portion 190 faces into the gap 100. The thickened portion 165 approaches the body 120 and the curved transition area 170 bends between the body 120 and the thickened portion 165. The portion 190 approximates the level of the arcuate surface 90 to create a smooth transition area between the blade 17 and the spacer 70.

To install the seal 115, the body 120 is attached to one of the legs 110 by gluing or the like. The second member 133 is bent about the hinge 170 and, as the legs 110 are slid (aided by the fabric cover 171) into the fan rotor 65, the portion 185 of the second member 133 abuts and slides along blade 17 the length $L_2$ until the legs 110 are seated in the fan rotor 65 and the gap 100 is filled.

Figure 4:
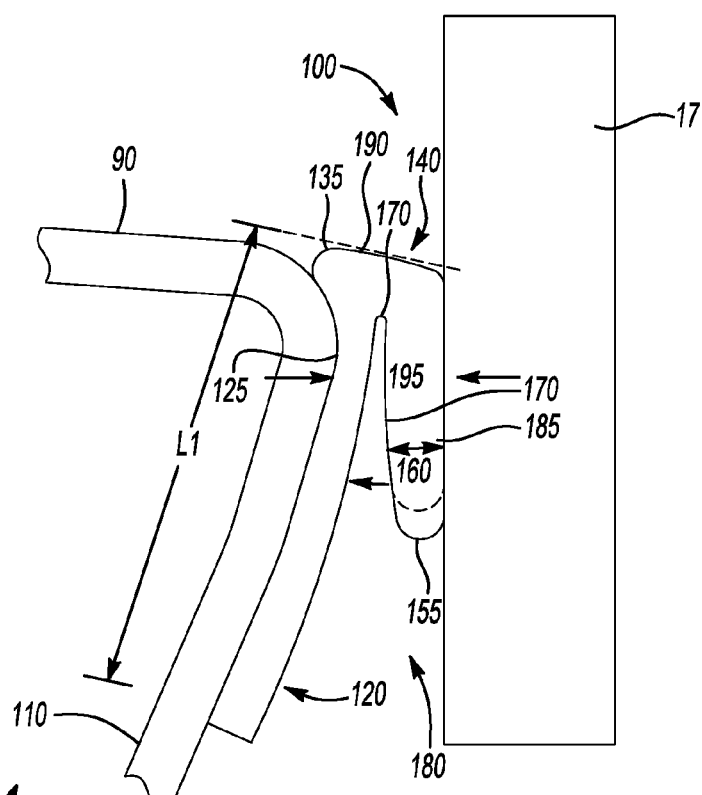
FIG. 4 is a schematic, cross-sectional view of a seal in an installed state in the fan ring of FIG. 2.

During operation, as the fan rotor 65 rotates with the blades 17 and spacers 70, centrifugal force acts upon the second member 133 and urges the bent portion 185 radially outwardly along the blade 17 so that the portion 190 tends to move towards plane with the arcuate outer surfaces 90 (see dotted lines in FIG. 4). However the second member 133 is not pulled out of contact with the blade because the thickened portion 165 is too stiff to allow enough bending of the second member 133 to invert itself through the gap 100. An effective seal is thereby provided between the blades 17 and the spacers 70.

The preceding description is exemplary rather than limiting in nature to those skilled in the art that do not necessarily depart from the essence of this disclosure. For instance, one of ordinary skill in the art will recognize that the teachings herein may be utilized in other types of rotating machinery than gas turbine engine and may be used where sealing between rotating parts in a ring may be necessary. The scope of legal protection given to this disclosure can only be determined by studying the following claims.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

The invention claimed is:

1. A seal for sealing a gap between adjacent first and second components that form a ring, said seal comprising:
   a first portion for attaching to said first component, wherein said first portion has a curved portion for bending around a joint or bend of said first component; and
   a second portion extending at an angle from said first portion, said second portion having a top extending therealong that is flat in an uninstalled position, a thickened portion beneath said top, and a hinge, wherein said thickened portion is disposed between said hinge and an end of said top.

2. The seal of claim 1 wherein said seal has an installed position wherein said second portion rotates about said hinge for engaging said second component.

3. The seal of claim 1 wherein said angle is less than approximately 90°.

4. The seal of claim 1 wherein a flat portion connects said curved portion and said top.

5. The seal of claim 1 further comprising a transition area connecting said thickened area and said first portion, said transition area defining said hinge.

6. The seal of claim 1 wherein said second portion bends about said hinge thereby having an first part for engaging said second component and a second part for extending toward said gap.

7. The seal of claim 6 wherein said first part moves radially outwardly during rotation of said components.

8. The seal of claim 1 wherein said first component is a spacer and said second component is a fan blade.

9. A method for sealing gaps between a spacer and a blade that at least partially form a ring, said method comprising:
providing a seal having a first portion for attaching to said spacer, a second portion extending at an angle from said first portion, said second portion having a top extending therealong that is flat in an uninstalled position, a thickened portion beneath said top and a hinge wherein said thickened portion is disposed between said hinge and an end of said top;
attaching said first portion of said seal to said spacer, wherein said attaching step includes attaching a curved portion of said first portion around a joint or bend of said spacer;
bending said second portion about said hinge; and
sliding said spacer along said blade such that said second portion abuts said blade and said second portion faces said gap.

10. The method of claim 9 wherein said bending step includes bending a transition area connecting said thickened area and said first portion, said transition area defining said hinge.

11. The method of claim 9 wherein said bending step includes bending said second portion into a first part engaging said blade and a second part facing toward said gap.

12. The method of claim 11 further comprising moving said first part radially outwardly during rotation of said blade and spacer.

13. An assembly for sealing a gap in a gas turbine engine, said assembly comprising:
a plurality of blades;
a plurality of spacers interspersed between said blades; and
a seal having:
a first portion fixedly attaching to one of said spacers, wherein said first portion has a curved portion for bending around a joint or bend of said spacer; and
a second portion extending at an angle from said first portion, said second portion having a top extending therealong that is flat in an uninstalled position, a thickened portion beneath said top, and a hinge, wherein said thickened portion is disposed below said top between said hinge and an end of said top.

14. The assembly of claim 13 wherein said seal has an installed position wherein said second portion rotates about said hinge and engages one of said blades.

15. The assembly of claim 13 further comprising a transition area connecting said thickened area and said first portion, said transition area defining said hinge.

16. The assembly of claim 13 wherein said second portion bends about said hinge, and wherein said first portion has a first part engaging said spacer and a second part facing said gap.

17. The assembly of claim 16 wherein the second portion moves radially outwardly during rotation of the spacers and the blades until the thickened area engages the second part.

\* \* \* \* \*